United States Patent [19]

Elbling et al.

[11] 4,040,993

[45] Aug. 9, 1977

[54] LOW DISSIPATION FACTOR ELECTROSTATIC EPOXY WIRE COATING POWDER

[75] Inventors: Irving N. Elbling, Pittsburgh; Howard E. Saunders, Penn Hills, both of Pa.

[73] Assignee: Westinghouse Electric Corporation, Pittsburgh, Pa.

[21] Appl. No.: 661,074

[22] Filed: Feb. 25, 1976

[51] Int. Cl.² .................. C08L 63/00; C08L 91/00
[52] U.S. Cl. .................. 260/18 EP; 260/830 TW; 260/836; 260/837 R; 427/27
[58] Field of Search ............... 260/18 EP, 830 TW

[56] References Cited

U.S. PATENT DOCUMENTS

| | | | |
|---|---|---|---|
| 3,374,193 | 5/1968 | Tsatsos | 260/18 EP |
| 3,388,185 | 6/1968 | Goldberg | 260/830 TW |
| 3,446,762 | 5/1969 | Lopez | 260/18 EP |
| 3,477,971 | 11/1969 | Allen | 260/830 TW |
| 3,484,398 | 12/1969 | Childs | 260/18 EP |
| 3,647,726 | 5/1972 | Ulmer | 260/18 EP |
| 3,706,684 | 12/1972 | Lopez | 260/18 EP |
| 3,842,035 | 10/1974 | Klaren | 260/830 TW |
| 3,896,082 | 7/1975 | Rensmann | 260/47 EN |
| 3,963,686 | 6/1976 | Katsimbas | 260/837 R |

*Primary Examiner*—Paul Lieberman
*Attorney, Agent, or Firm*—R. D. Fuerle

[57] ABSTRACT

A coating powder is made by hot melt mixing a composition of three diglycidyl ethers of bisphenol A, a pre-prepared epoxy ester, and a curing agent containing trimellitic anhydride. The composition is cooled to form a solid which is ground into a powder. Wire or other articles are coated with the coating powder in an electrostatic fluidized bed or with an electrostatic gun and the powder is cured.

12 Claims, No Drawings

LOW DISSIPATION FACTOR ELECTROSTATIC EPOXY WIRE COATING POWDER

BACKGROUND OF THE INVENTION

Wire and other conductors can be coated with epoxy resins by passing a heated conductor through a fluidized epoxy powder, then through an oven, or by passing a cold, grounded conductor through an electrostatically charged powder, then through an oven. In either method, no solvent is present and, therefore, unlike enamel coatings, no heat is used to evaporate a solvent

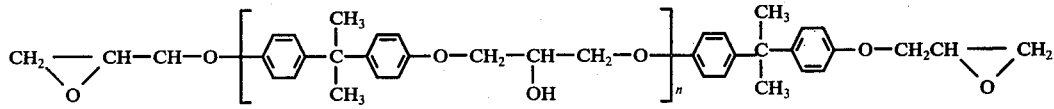

and there are no air pollution problems due to solvent vapors. Initially, however, epoxy coating powders tended to be insufficiently flexible or if flexible originally, they tended to lose their flexibility within a few days. When the coated wire was sharply bent, the inflexible insulation cracked.

While this problem has been largely overcome recently (see application cited below), the new, more flexible powders have dissipation factors, especially at higher temperatures, which are too high to permit their use in certain electrical apparatus such as some transformers.

PRIOR ART

U.S. Patent Application, Ser. No. 468,336, filed May 8, 1974 by Charles M. Noonan, titled "Thin Film Electrostatic Epoxy Coating Powder," discloses a coating powder prepared by extruding a composition of two epoxy resins, a pre-prepared epoxy ester, and a curing agent.

U.S. Pat. No. 3,374,193 discloses a polyepoxide fluidized bed coating composition.

U.S. Pat. No. 3,484,398 discloses a powdered epoxy resin composition.

SUMMARY OF THE INVENTION

We have found that a coating powder prepared by hot melt mixing a composition of three epoxy resins, a pre-prepared epoxy ester, and a curing agent containing trimellitic anhydride produces an insulation which is as flexible as the previous flexible epoxy powders, but which has a much lower dissipation factor. The powder is especially suited for use with electrostatic guns or in electrostatic fluidized beds.

DESCRIPTION OF THE INVENTION

A composition is first prepared of (1) about 20 to about 80 phr (parts per hundred parts resin, where "resin refers to the epoxies and epoxy ester") of diglycidyl ether of bisphenol A having an E.E.W. (epoxy equivalent weight) of at least 1600 and a Durran's softening point of at least 113° C, (2) about 10 to about 60 phr of a second diglycidyl ether of bisphenol A having an E.E.W. of 700 to 900 and Durran's softening point of at least 112° C, (3) about 5 to about 50 phr of a third diglycidyl ether of bisphenol A having an E.E.W. of less than 1000 and a Durran's softening point of less than 105° C, (4) about 10 to about 60 phr of an epoxy ester, and (5) about 5 to about 20 phr of a curing agent containing trimellitic anhydride. In the preferred composition, which produces the lowest dissipation factors, the second diglycidyl ether of bisphenol A has an E.E.W. of about 780 to about 825 and a Durran's softening point of about 112° to about 120° C. A composition using about 40 to about 60% of the epoxy ester has better resistance to certain solvents such as chlorinated benzenes and is therefore preferred where the coating contacts these solvents.

THE DIGLYCIDYL ETHERS

The diglycidyl ethers of bisphenol A have the general formula:

where $n$ determines the molecular weight and therefore the epoxy equivalent weight (E.E.W.) as is well-known.

It has been found that if the first epoxy is not present, the coating has poor flexibility and poor electric strength. If the second epoxy is not present, the coating has poor build and poor edge coverage; and if the third epoxy is not present, the coating has poor electric strength and poor flow. All three are needed if the desired properties are to be obtained.

THE EPOXY ESTERS

Essential to producing a flexible insulation is the presence in the composition of an epoxy ester of a dibasic acid. Also, the epoxy ester must be added to the composition as the ester and not as epoxy and dibasic acid separately, since when they are added separately, the dibasic acid sticks to the melt mixing apparatus. The epoxy used in forming the epoxy ester is a diglycidyl ether of bisphenol A having an E.E.W. of at least about 400 and a Durran's softening point of at least about 70. Preferably, the diglycidyl ether of bisphenol A which is used has an E.E.W. of about 700 to about 875 and a Durran's softening point of about 85° to about 100° C. For simplicity the epoxy used is preferably identical to one of the epoxies used in the mixture of epoxies.

The dibasic acid has the formula HOOC $(-CH_2-)_m$-COOH where $m$ is from about 18 to about 54; $m$ is preferably about 36. However, in most commercial products, the acids have a mixture of molecular weights and some monobasic and tribasic acids are also present. These esters may be prepared by heating the epoxy and the dibasic acid together, as is known in the art and is illustrated by the example which appears hereinafter.

CURING AGENT

The epoxy curing agent must contain trimellitic anhydride (TMA) or esterified TMA for otherwise when the powder melts on the wire it will flow off the wire. Without TMA or esterified TMA, the coating is not flexible and has poor heat shock and poor heat aging. The minimum amount of TMA or esterified TMA which must be present is at least 10% (by weight) of the anhydride equivalent weight, i.e., at least 10% of the stoichiometric amount of anhydride required to cure the resin. Other anyhydride curing agents or curing agents other than anhydrides may be used in combination with TMA, although 100% TMA is preferred, but those nitrogenous curing agents which decrease the dissipation faster such as dicyandiamide, imidazoles, and amines should be avoided. Also, not more than 20% of the curing agent can be trimellitic acid or acid chloride as more results in pinholes and poor electric strength. Preferably, a stoichiometric amount of curing agent is used, though a slight excess or a slight deficiency is sometimes desirable. Examples of other curing agents which can be used in combination with TMA include pyromellitic dianhydride, tetrahydriophthalic anhydride, benzophenone tetracarboxylic dianhydride, and other similar compounds. Also, some of the standard anhydride curing agents which are sensitive to water can be partly esterified to produce suitable curing agents.

The esterified TMA which may be used instead of TMA generally has the formula

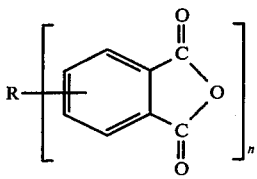

where $n$ is an integer from 1 to 3 and R is aliphatic or aryl. Preferably, R is an esterified alcoholic residue, more preferably a residue of a di or tri ester of a polyhydride alcohol as these latter compounds give dianhydrides which produce more cross-linking. Examples include the following compounds

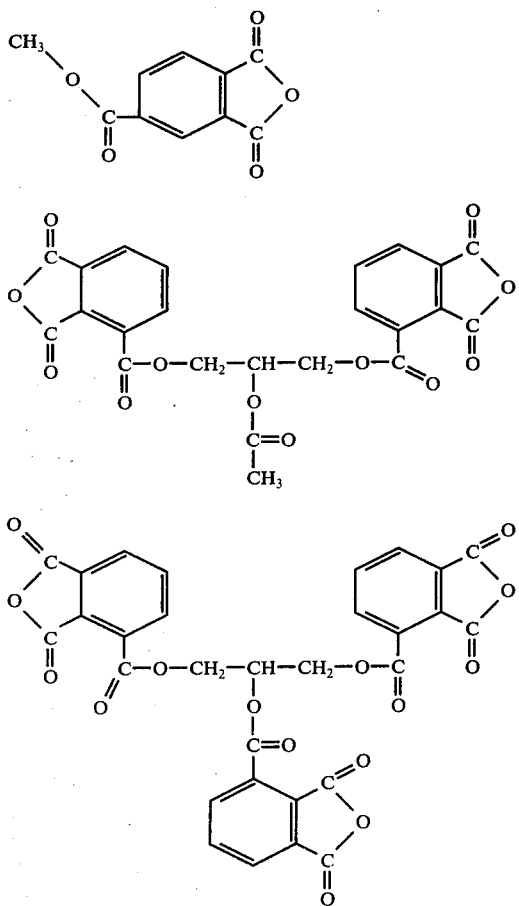

Preferances between TMA and various adducts have not yet been established.

THE ACCELERATOR

An accelerator is preferably not present as it may lower shelf life and other properties such as heat shock and thermal aging, but one may be used if desired. Accelerators which increase the curing speed without sacrificing thermal, electrical, or mechanical properties include, for example, quaternary phosphonium salts and various proprietary compounds, which may be used at about 2 to about 8 phr.

THE FLOW CONTROL AGENT

The composition also preferably includes about 0.5 to about 3.0% (by weight) of a flow control agent which produces a more uniform coating having a smoother, glossier appearance. If a flow control agent is not present, the coating tends to form pinholes, cissing, or craters during curing, and frequently orange peel effects may occur. A good flow control agent which does not lessen the flexibility of the coating, is a polyacrylate sold by Monsanto Chemical Company under the trademark "Modaflow". Other suitable flow control agents include thixotropes such as fumed silica, pulverized asbestos, bentonite clay, etc.

The composition may also contain other optional ingredients such as up to about 10% of a dye or pigment.

PREPARATION OF THE POWDER

After the composition has been homogeneously dry mixed, it is placed in an apparatus for hot melt mixing such as a two-roll mill, a sigma blade mixer. a Banbury mixer, or an extruder. An extruder is preferred as it produces coatings with the best properties. Especially advantageous are a twin screw extruder and a type of extruder known as a kneader. A kneader functions in the same way as an extruder, but also imparts a reciprocating axial motion to the extruder screw or screws. A twin screw extruder or a kneader is preferred because it gives a more homogeneous mixture and better properties, for example, better gloss. The hot melt mixing is preferably performed near but above the melting point of the composition, which is usually at about 40° to about 100° C. In an extruder, several heat zones are common. For example, the extruder may have a back zone at about 40° to about 60° C and a die at about 90° to about 100° C. The residence time in an extruder is typically about 2 to about 3 minutes, and if the extruder is a twin screw extruder or a kneader, about 60 to about 90 seconds.

After hot melt mixing, the composition is cooled to a solid, and ground in a microcrusher to produce pieces about ⅛ to about ½ inch in size. These pieces are ground in a pulverizer then passed through a sieve to obtain the powder. Fine powders are used for making thin coatings, but if the powder is too fine, it will not fluidize well and may create medical problems or an explosion. hazard. Therefore, the particle size should be at least about 5 microns. On the other hand, the powder should be finer than about 100 mesh (i.e. about 149 microns) or it will not retain a charge well and may fall off the article to be coated when used in an electrostatic fluidized bed. A very good particle size is between 200 mesh (74 microns) and 400 mesh (38 microns).

COATING

The powder may be used in fluidized beds or other application apparatus, but an electrostatic gun or electrostatic fluidized bed is required to produce thin films (i.e., <5 mils). Electrostatic coating also tends to produce a coating of more uniform thickness. The wire or article to be coated is grounded and the powder is charged with either negative or positive polarity, causing the powder to cling to the wire or article. Heat is then applied to melt and cure the powder.

The cure is typically performed in a wire tower at about 200° to 400° C, usually for less than 1 minute, though the cure time depends on the temperature. Higher temperatures are used for wire coating than for coating large surfaces. The curing time can often be reduced by using infrared or induction heating, which may be especially useful in coating wire. A wire coating of about 1 to 16 mils ordinarily results, depending on the size of the charge and other variables. Coatings of up to about 100 mils in thickness can be produced in an electrostatic fluidized bed by preheating the wire or article to be coated before passing it through the bed.

An especially desirable product using the coating powder of this invention is "thin film" (i.e., approximately 2 mils) coated round, square, or rectangular wire of about 10 to about 600 mil copper, aluminum steel, or other metal. However, the coating powder may also be used to coat and insulate other material such as metal foil, transformer parts, printed circuit boards, fence wire, containers and lids, cans, coat hangers, bobby pins, etc.

The following examples further illustrate this invention.

EXAMPLE 1

This example falls within the scope of this invention. A partial ester was pre-prepared by charging a reaction vessel with the following composition:

| Components | Parts by Weight (pbw) |
|---|---|
| Diglycidyl ether of bisphenol A, E.E.W.= 700 to 875, Durran's softening point = 88 to 98° C, sold by Dow Chemical Co. under the trademarks "DER 663U" | 600 |
| Sodium Carbonate | 0.4 |
| Dibasic Acid of the Formula COOH-$C_{36}H_{72}$-COOH sold by Emery Industries under the trademark "EMPOL 1022" | 59.6 |

The "EMPOL 1022" includes some higher and lower dibasic acids ($C_{18}$ to $C_{54}$) and some monobasic and tribasic acids. Other "EMPOL's" which may also be used include No. 1010, 1012, 1014, 1016, 1018, 1024, 1040, and 1041. The composition was reacted at 160° C under nitrogen to an acid value of 1.

The following composition was prepared:

| | Parts by Weight |
|---|---|
| Diglycidyl ether of bisphenol A, E.E.W. = 1600 to 2000, Duran's softening point = 127 to 133° C, sold by Celanese Corp. under the trademark "EPIREZ 540" | 14.83 |
| "DER 663U" Diglycidyl ether of bisphenol A, E.E.W. = 780 to 825, Durran's softening point = 112 to 120° C, sold by Dow Chemical Co. under the trademark "XD-3542" | 4.91 13.36 |
| Trimellitic Anhydride | 6.26 |
| Polyacrylate Flow Control Agent, a viscous amber liquid, specific gravity; 60/60° F = 1.00, density (lb/gal) = 8.3, viscosity, (SUS at 210° F) = 5000 viscosity (centistokes US at 210° F) = 5000 viscosity (centistokes) at 98.9° C = 1150 SFS, sold by Monsanto Chemical Co. under the trademark "MODAFLOW" | 0.26 |
| Partial Ester | 8.40 |

The "DER 663" was melted at 150° C, then cooled to 125° C. The "MODAFLOW" was stirred into the molten resin. After thorough mixing, the melt was cooled to room temperature, then crushed using a Wiley mill. This crushed product was used in the formulation.

The entire composition was then mixed and fed through a Model PR 46 Kneader (manufactured by Buss Corporation, Chicago, Ill.) set with a screw speed of 54 RPM and a feed hopper speed of 12.5 RPM. The rear zone of the kneader and the screw were maintained at 45°–50° C. The front zone of the kneader was maintained at 90°–100° C. The kneader ribbon die was heated to 90°–100° C. The extrudate was obtained at a rate of 25-30 lbs/hr and it was cooled by passing it through water-cooled squeeze rolls, then it was crushed and ground to pass at least 95% through a 200 mesh (32 micron) screen.

This product was used to coat rectangular aluminum wire (0.114 × 0.289 in) which had been thoroughly cleaned. The wire was passed through an electrostatic fluidized bed containing the powder, then into a vertical gas fired tower with a temperature gradient of ambient to 400° C at speeds from 12 to 19 ft/min. Smooth coatings were obtained with builds from 4.5-5.5 mils. The wire passed a 2× edgewise bend test over a mandrel without cracking. Electric strengths were as follows.

| Wire Speed | Electric Strength |
|---|---|
| 12 ft/min | 1.0 to 4.4 kV |
| 17 ft/min | 2.0 to 5.2 kV |

EXAMPLE 2

This example also illustrates the invention. The following composition was prepared:

| Ingredients | Part by Weight |
|---|---|
| "EPIREZ 540" | 742 |
| "DER 663U" | 245 |
| "MODAFLOW" | 14 |
| Partial ester | 420 |
| Trimellitic anhydride | 209 |
| Rutile titanium dioxide, sold by DuPont under the trademark "R-900" | 61 |
| Cobalt blue, sold by Harsaw Chemical Co. under the trademark "RX-7570" | 117 |

The composition was converted into a coating powder as described in Example 1.

The powder was coated onto 0.129 × 0.258 clean copper wire as described in Example 1 at speeds up to 35 ft/min. The average electric strength was 3950 volts. The coating passed a 2× edgewise bend test without cracking or flaking. The coated wire passed a heat shock test consisting of 10% elongation followed by heating for ½ hour at 175° C.

In a severe test of flexibility, 0.125 × 0.284 in. aluminum wire was cleaned and coated. Elongated, bent, and straight samples were aged for 180 days at 150° C in a sealed tank filled with oil and transformer parts, then tested. Five tests were made for adhesion and flexibility. These tests consisted of mounting 10 inches of the wire between jaws, elongating 15% at a rate of 12 inches/min ± 1 inch/min., then inspecting for cracks; 100% of the wire tested passed. Five tests were made for edgewise and flatwise bending as previously described; 100% of the wire tested passed the test. Twelve tests were made for dielectric strength. These tests consisted of wrapping ½ inch wide adhesive tape having ¼ inch strip of aluminum foil along the center 1½ times around the wire. A current was applied between the wire and the aluminum foil increasing to 500 volts/sec until the insulation failed. Insulation is considered to pass this test if it withstood 1000 volts without breakdown; 100% of the coated wire samples passsed this test. For comparison, rectangular wire (0.114 × 0.289 in) was coated separately with two commercial epxoy powders and subjected to the same test. Both commercial powders failed the adhesion and flexibility tests after 28 days aging in oil at 150° C.

The dissipation factor of the powder of this example was measured at various temperatures and compared to two new flexible epoxy powders formulated for wire coating, but not within the scope of this invention.

| | DISSIPATION FACTORS | | | | | |
|---|---|---|---|---|---|---|
| | 25° C | 50° C | 75° C | 105° C | 125° C | 150° C |
| This Example | 0.23 | | 0.39 | 1.6 | 3.7 | 7.5 |
| Flexible Powder No. 1 | 0.34 | 0.38 | | 1.6 | 45 | 2100 |
| Flexible Powder No. 2 | 0.36 | | 0.26 | 0.64 | 11 | 123 |

EXAMPLE 3

The example shows the results of omitting the high and middle weight epoxies.

The following composition was prepared.

| Ingredient | Parts by Weight |
|---|---|
| Partial Ester | 3780 |
| "XD-3542" | 648 |
| "MODAFLOW" | 23 |
| Trimellitic Anhydride | 445 |

The "XD-3542" and the "MODAFLOW" were master-batched together as described in Example 1 for "DER 663U" and "MODAFLOW."

This composition was converted into a coating powder as described in Example 1.

The powder was used to coat wire as described in Example 1 at speeds from 15-19 ft/min. Electric strengths were below the level desired:

| Speed | Breakdown (KV) |
|---|---|
| 15 | 0.3, 0.5, 0.6, 1.4 |
| 17 | 0.3, 0.5, 0.5, 0.8 |
| 19 | 0.7, 0.8, 1.0, 1.4 |

| DISSIPATION FACTOR | | | |
|---|---|---|---|
| 50° C | 100° C | 125° C | 150° C |
| 0.78 | 1.3 | 4.0 | 6.7 |

The coating passed a 2× edgewise bend without cracking.

EXAMPLE 4

This example shows what happens when the epoxy with the highest E.E.W. is omitted.

| Ingredients | Parts by Weight |
|---|---|
| "DER 663U" | 2994 |
| "MODAFLOW" | 39 |
| "XD-3542" | 540 |
| Partial ester | 800 |
| Trimellitic anhydride | 437 |

This composition was converted into a coating powder as described in Example 1.

The powder was coated onto wire as described in Example 1. At all speeds from 9 to 19 ft/min the coating had a rough surface. Electric strengths were too low for use.

| Speed | Breakdown (KV) |
|---|---|
| 15 ft/min | 0.6, 0.8, 1.0, 1.2 |

The coating passed a 2× edgewise bend without cracking.

EXAMPLE 5

The first formulation in this example shows the results of using a nitrogenous curing system.

The following formulation was prepared.

| Ingredients | Parts by Weight |
|---|---|
| "EPIREZ 540" | 2118 |
| "DER 663U" | 701 |
| "MODAFLOW" | 37 |
| "XD-3542" | 1908 |
| Partial Ester | 1200 |
| Dicyandiamide | 150 |
| An accelerator believed to be a mixture of 2-methyl imidazole and dicyandiamide, sold by Dow Chemical Co. under the trademark "D.E.H. 40" | 150 |

These ingredients were converted into a coating powder as described in Example 1.

The powder was coated onto wire as described in Example 1. At 14 ft/min, the average breakdown voltage was 2.63 KV and 2% of the values were below 1 KV. The coated wire passed a 2× edgewise bend around a mandrel.

The next formulation in this example shows the results of omitting the higher molecular weight resin when a nitrogenous curing system is used.

| Ingredients | Parts by Weight |
|---|---|
| A diglycidyl ether of bisphenol A, E.E.W. = 800 to 1015, Durran's softening point = 95 to 105° C, sold by Celanese Corp. under the trademarks "EPIREZ 530" | 2118 |
| "DER 663U" | 701 |
| "MODAFLOW" | 37 |
| "XD-3542" | 1908 |
| Partial Ester | 1200 |
| Dicyandiamide | 150 |
| "D.E.H. 40" | 150 |

The above formulation was made into a coating powder, then coated onto wire as described in Example 1. The coated wire had an average breakdown voltage of 1.59 KV, with 19% of the values below 1 KV, at a coating speed of 14 ft./min. The coated wire passed a 2× edgewise bend around a mandrel. Both formulations in this example had unacceptably high dissipation factors (i.e., > 100° at 150° C) because of their curing systems.

EXAMPLE 6

This example shows what happens when trimellitic anhydride is omitted from the composition.
The following formulation was prepared.

| Ingredients | Parts by Weight |
|---|---|
| Partial Ester | 3780 |
| "XD-3542" | 648 |
| "MODAFLOW" | 23 |
| Tetrahydro phthalic anhydride | 432 |
| Tetrabutyl phosphonium acetate | 1.3 |

The "XD-3542" and the MODADLOW" were master-batched as in Example 3.

This formulation was converted into a coating powder as described in Example 1. It was discovered that the powder thus made would not fluidize satisfactorily in the electrostatic fluidized bed used for coating, neither would it feed well when a Nordson NPS-1M electrostatic powder coating gun was employed. The powder was mixed in a V-blender for 15 minutes with 0.5 p.hr. of a fumed silica sold by Cabot Corp. under the trademark "CAB-O-SIL M-5." After this treatment, the powder was found to fluidize and was coated onto wire as described in Example 1. The coated wire crazed on spooling, even at speeds as low as 9 ft/min.

EXAMPLE 7

This example compares the results of omitting TMA (Formulations A and B), and of using at least some TMA (Formulation C).
The following formulations were prepared.

| Formulation | Ingredient | Parts by Weight |
|---|---|---|
| A | "EPIREZ 540" | 742 |
| | "DER 673" | 259 |
| | "XD-3542" | 668 |
| | Partial Ester | 420 |
| | Pyromellitic dianhydride | 73 |
| | Tetrahydrophthalic anhydride | 166 |
| B | "EPIREZ 540" | 742 |
| | "DER 673" | 259 |
| | "XD-3542" | 668 |
| | Partial Ester | 420 |
| | Benzophenone tetracarboxylic acid dianhydride | 274 |
| C | "EPIREZ 540" | 742 |
| | "DER 673" | 259 |
| | "XD-3542" | 668 |
| | Partial Ester | 420 |
| | Trimellitic anhydride | 105 |
| | Pyromellitic dianhydride | 89 |

"DER 673" is a master-batch of 95 pbw "DER 663U" and 5 pbw "MODAFLOW," and is manufactured by Dow Chemical Co.

The above formulations were converted into coating powders as described in Example 1.

The powders, together with the powder described in Example 6, were coated onto short lengths of clean 0.114 × 0.289 in. aluminum wire using a Nordson NPE-1M electrostatic powder gun. All the coated samples were cured for ½ hr. at 200° C in a conventional forced-air convection oven. The coating build was approximately 5 mils. Samples of each coated formulation were bent edgewise around a 0.9 inch diameter mandrel. All save formulation B passes this test without cracking. When electric breakdown measurements were performed on coated samples, the results were as follows.

| Formulation | Electric Strength (KV) |
|---|---|
| Example 6 | <1 |
| A | 3.0 – 4.6 |
| B | 4.5 – 5.8 |
| C | 1.5 – 2.5 |

The above powders were checked for storage life at 40° C. Samples of each powder sealed in polyethylene bags were placed in an oven at 40° C. They were withdrawn daily and subjected to a stroke cure (gel) time test as follows: A small sample of each powder was placed on a hot plate maintained at 200° + 1° C, and a stopwatch immediately started. The powder was spread into a thin layer over the hot surface, and was repeatedly touched with a probe until the molten layer had gelled. This time was recorded for various formulations as shown below:

| | Percent of Initial Stroke Cure (Gel) Time Remaining | | | | | | | | | |
|---|---|---|---|---|---|---|---|---|---|---|
| | Days at 40° C | | | | | | | | | |
| Formulation | 0 | 1 | 2 | 3 | 4 | 5 | 6 | 7 | 8 | 9 |
| Example 2 | 100 | 98 | | 88 | 85 | 83 | 75 | 67 | 67 | 67 |
| Example 6 | 100 | Test discontinued, powder formed lumps after 1 day | | | | | | | | |
| A | 100 | 87 | Test discontinued, powder formed lumps | | | | | | | |
| B | 100 | 88 | 86 | — | — | — | 81 | 79 | 79 | 79 |
| C | 100 | 98 | 97 | — | — | — | 93 | 93 | 91 | 91 |

Thus, only formulations containing at least some trimellitic anhydride were satisfactory in electric strength, flexibility, and storage life.

EXAMPLE 8

This example illustrates the use of an accelerator.
The following formulation was prepared.

| Ingredient | Parts by Weight |
| --- | --- |
| "EPIREZ 540" | 494 |
| "DER 673" | 172 |
| "XD-3542" | 445 |
| Partial Ester | 280 |
| Trimellitic anhydride | 139 |
| Tetrabutyl phosphonium acetate | 0.4 |

This formulation was converted into a powder and coated on wire as described in Example 1. Satisfactory coating was obtained.

| Speed | Electric Breakdown (KV) | 2X Mandrel |
| --- | --- | --- |
| 9 ft/min | 1.2 – 3.0 | Pass |
| 14 ft/min | 1.0 – 3.5 | Pass |

EXAMPLE 9

This example illustrates the use of a TMA adduct with an accelerator.
The following formulation was prepared.

| Ingredient | Parts by Weight |
| --- | --- |
| "EPIREZ 540" | 1953 |
| "DER 673" | 680 |
| "XD-3542" | 1760 |
| Partial Ester | 1107 |
| 2-Acetoxyglyceryl di (anhydrotrimellitate) sold by R.T. Vanderbilt Co. under the trademark "Polydride 230" | 1034 |
| Tetrabutyl phosphonium acetate | 3.1 |
| Cobalt Blue | 337 |
| Titanium Dioxide | 177 |

The formulation was converted into a powder and coated on wire as described in Example 1. With such a formulation much higher wire coating speeds were obtained.

| Wire size = 0.114 × 0.258 in. aluminum | | | | | |
| --- | --- | --- | --- | --- | --- |
| Speed (ft/min) | Build (mil) | Adhesion (15% elongation) | Heat Shock (10% + ½hr 175° C) | 90° Edgewise Bend | Electric Breakdown (KV) |
| 40 | 3.6–6.0 | Pass | Pass | Pass | 1.1–5.1 |
| 50 | 4.0–7.5 | Pass | Pass | Pass | 1.1–4.3 |

We claim:

1. A coating powder made by
   A. preparing by dry mixing a composition which comprises:
   1. about 20 to about 80 phr of a first diglycidyl ether of bisphenol A having an E.E.W. of at least 1600 and a Durran's softening point of at least 113° C;
   2. about 10 to about 60 phr of a second diglycidyl ether of bisphenol A having an E.E.W. of 700 to 900 and a Durran's softening point of at least 112; and,
   3. about 5 to about 50 phr of a third digylycidyl ether of bisphenol A having an E.E.W. of less than 1000 and a Durran's softening point of less than 105° C;
   4. about 10 to about 60 phr of a pre-prepared epoxy ester, the epoxy portion of said ester being derived from a diglycidyl ether of bisphenol A having an E.E.W. of at least about 400 and a Durran's softening point of at least about 70, and the ester portion being derived from a dibasic acid having the formula $HOOC—(CH_2)_m—COOH$, where $m$ is about 18 to about 54; and
   5. about 5 to about 20 phr of a curing agent for said diglycidyl ethers, at least about 10% by weight of the anhydride equivalent weight of said curing agent being selected from the group consisting of trimellitic anhydride, esterified trimellitic anhydride, and mixtures thereof;
   B. hot melt mixing said composition;
   C. cooling said composition to form a solid;
   D. grinding said composition into a powder having a particle size of about 5 to about 149 microns.

2. A coating powder according to claim 1 wherein said second diglycidyl ether of bisphenol A has an E.E.W. of about 780 to about 825 and a Durran's softening point of about 112° to about 120° C.

3. A coating powder according to claim 1 wherein said hot melt mixing is performed in an extruder.

4. A coating powder according to claim 3 wherein said hot melt mixing is performed in a kneader or twin-screw extruder.

5. A coating powder according to claim 1 wherein said hot melt mixing is performed near but above the melting point of said composition.

6. A coating powder according to claim 1 wherein said composition is ground to a powder having a particle size of about 200 to about 400 mesh.

7. A coating powder according to claim 1 wherein said composition includes about 0.05 to about 3% of a flow control agent.

8. A coating powder according to claim 1 wherein $m$ is about 36.

9. A coating powder according to claim 1 wherein the amount of said epoxy ester is about 40 to about 60 phr.

10. A coating powder according to claim 1 wherein said curing agent is at least 10% TMA.

11. A coating powder according to claim 1 wherein said esterified TMA is a di or tri TMA ester of a polyhyric alcohol.

12. A method of making a coating powder comprising:
   A. preparing by dry mixing a composition which comprises:
   1. a first diglycidyl ether of bisphenol A having an E.E.W. of at least 1600 and a Durran's softening point of at least 113° C;
   2. about 10 to about 60 phr of a second diglycidyl ether of bisphenol A having an E.E.W. of 700 to 900 and a melting point of at least 112°;
   3. about 5 to about 50 phr of a third diglycidyl ether of bisphenol A having an E.E.W. of less than 1000 and a Durran's softening point of less than 105° C;
   4. about 10 to about 60 phr of a pre-prepared epoxy ester, the epoxy portion of said ester being derived from a diglycidyl ether of bisphenol A having an E.E.W. of at least about 400 and a Durran's softening point of at least about 70, and the ester portion being derived from a dibasic acid having the formula $HOOC-(CH_2)_m-COOH$, where $m$ is about 18 to about 54; and 5. about 5 to about 20 phr of a curing agent for said diglycidyl ethers at least about 10% by weight of the anhydride equivalent weight of said curing agent being trimellitic anhydride;

B. hot melt mixing said composition;
C. cooling said composition to form a solid; and
D. grinding said composition into a powder.

* * * * *